(12) United States Patent
Byrne et al.

(10) Patent No.: US 10,468,860 B2
(45) Date of Patent: Nov. 5, 2019

(54) RUGGED WEATHER RESISTANT POWER DISTRIBUTION

(71) Applicants: Norman R. Byrne, Ada, MI (US); Peter J. Maher, Grand Rapids, MI (US)

(72) Inventors: Norman R. Byrne, Ada, MI (US); Peter J. Maher, Grand Rapids, MI (US)

(*) Notice: Subject to any disclaimer, the term of this patent is extended or adjusted under 35 U.S.C. 154(b) by 0 days.

(21) Appl. No.: 15/727,927

(22) Filed: Oct. 9, 2017

(65) Prior Publication Data

US 2018/0102632 A1   Apr. 12, 2018

Related U.S. Application Data

(60) Provisional application No. 62/405,485, filed on Oct. 7, 2016.

(51) Int. Cl.
| | |
|---|---|
| *H02B 1/28* | (2006.01) |
| *H01R 27/00* | (2006.01) |
| *H02G 3/04* | (2006.01) |
| *H01R 25/16* | (2006.01) |
| *H01R 13/52* | (2006.01) |
| *H02B 1/20* | (2006.01) |
| *H01R 27/02* | (2006.01) |

(52) U.S. Cl.
CPC .......... *H02B 1/28* (2013.01); *H01R 13/5219* (2013.01); *H01R 25/162* (2013.01); *H01R 27/00* (2013.01); *H01R 27/02* (2013.01); *H02B 1/20* (2013.01); *H02G 3/0406* (2013.01)

(58) Field of Classification Search
CPC .............................. H01R 25/16; H01R 25/162
See application file for complete search history.

(56) References Cited

U.S. PATENT DOCUMENTS

| | | | |
|---|---|---|---|
| 1,333,003 A | | 3/1920 | Titus |
| 2,094,681 A | | 10/1937 | Sears |
| 2,157,527 A | | 5/1939 | Clarke et al. |
| 3,049,688 A | | 8/1959 | Sinopoli |
| 3,120,987 A | * | 2/1964 | Degnan ............... H01R 13/5213 439/588 |

(Continued)

OTHER PUBLICATIONS

PCT Search Report and Written Opinion for the corresponding International Application No. PCT/IB2017/056234, dated Feb. 28, 2018.

*Primary Examiner* — Robert J Hoffberg
(74) *Attorney, Agent, or Firm* — Gardner, Linn, Burkhart & Ondersma LLP

(57) ABSTRACT

An electrical system for group seating arrangements includes a plurality of conduit assemblies and a plurality of branch assemblies, each made up of hollow casings with electrical connectors and seals at their opposite ends, and with electrical conductors providing continuity to the electrical connectors of each branch and conduit assembly. A mechanical latch or lock coupling at each of the ends, combined with a seal at each coupling or junction, provides a secure and contaminant-resistant mechanical connection and at each conduit-to-conduit or conduit-to-branch junction. The hollow casings of the conduit assemblies and branch assemblies may be made of high-strength material so as to resist damage from impacts when installed in high traffic areas such as stadiums, arenas, theaters, and public transit vehicles.

16 Claims, 5 Drawing Sheets

(56) References Cited

U.S. PATENT DOCUMENTS

| | | | | |
|---|---|---|---|---|
| 3,207,839 | A * | 9/1965 | Joly | H01R 13/64 174/720 |
| 3,295,096 | A * | 12/1966 | Gillespie | H01R 31/02 439/651 |
| 3,297,886 | A | 1/1967 | Danner | |
| 3,585,569 | A | 6/1971 | Moran | |
| 3,598,900 | A | 8/1971 | Drake | |
| 3,880,487 | A * | 4/1975 | Goodman | H01R 13/50 439/279 |
| 3,984,622 | A | 10/1976 | Ross | |
| 4,099,824 | A | 7/1978 | Schoppelrey | |
| 4,399,371 | A | 8/1983 | Ziff et al. | |
| 4,434,377 | A | 2/1984 | Shima et al. | |
| 5,184,960 | A * | 2/1993 | Hopkins | B60D 1/62 280/422 |
| 5,234,360 | A | 8/1993 | Kramer, Jr. | |
| 5,236,374 | A | 8/1993 | Leonard et al. | |
| 5,238,424 | A | 8/1993 | Vindum | |
| 5,275,574 | A | 1/1994 | Schlothauer et al. | |
| 5,283,392 | A | 2/1994 | Ooshima et al. | |
| 5,414,212 | A | 5/1995 | Clouet et al. | |
| 5,518,214 | A | 5/1996 | Spencer | |
| 5,547,399 | A | 8/1996 | Naghi et al. | |
| 5,575,668 | A | 11/1996 | Timmerman | |
| 5,606,150 | A | 2/1997 | Radliff et al. | |
| 5,616,968 | A | 4/1997 | Fujii et al. | |
| 5,676,563 | A | 10/1997 | Kondo et al. | |
| 5,902,148 | A | 5/1999 | O'Rourke | |
| 5,957,714 | A | 9/1999 | Johnson et al. | |
| 6,028,267 | A | 2/2000 | Byrne | |
| 6,133,845 | A | 10/2000 | Toms et al. | |
| 6,179,381 | B1 | 1/2001 | Gevaert | |
| 6,207,894 | B1 | 3/2001 | Reiker | |
| 6,257,923 | B1 | 7/2001 | Stone et al. | |
| 6,259,027 | B1 | 7/2001 | Watanabe | |
| 6,281,434 | B1 | 8/2001 | Gretz | |
| 6,281,439 | B1 | 8/2001 | Reiker | |
| 6,290,518 | B1 | 9/2001 | Byrne | |
| 6,362,987 | B1 | 3/2002 | Yurek et al. | |
| 6,422,884 | B1 * | 7/2002 | Babasick | H01R 13/5812 439/222 |
| 6,486,407 | B1 | 11/2002 | Hawker et al. | |
| 6,558,180 | B2 * | 5/2003 | Nishimoto | H01R 9/223 439/271 |
| 6,573,617 | B2 | 6/2003 | Jones et al. | |
| 6,601,798 | B2 * | 8/2003 | Cawley | B60N 2/0224 244/118.6 |
| 6,746,273 | B1 | 6/2004 | Liu et al. | |
| 6,767,255 | B1 | 7/2004 | Croswell | |
| 6,786,765 | B2 | 9/2004 | Bauermeister et al. | |
| 6,805,579 | B2 | 10/2004 | Marchand et al. | |
| 7,057,108 | B1 | 6/2006 | Sodemann et al. | |
| 7,066,616 | B2 | 6/2006 | Howell | |
| 7,188,805 | B2 * | 3/2007 | Henley | B64D 11/06 244/118.5 |
| 7,210,960 | B2 | 5/2007 | Mak | |
| 7,229,302 | B1 | 6/2007 | Lai | |
| 7,282,645 | B2 | 10/2007 | Locke | |
| 7,285,021 | B2 | 10/2007 | Bell et al. | |
| 7,467,967 | B2 | 12/2008 | Kuo | |
| 7,511,226 | B2 | 3/2009 | Fahey | |
| 7,537,485 | B2 | 5/2009 | Bell et al. | |
| 7,591,673 | B2 | 9/2009 | Chan et al. | |
| D604,253 | S | 11/2009 | Andre et al. | |
| 7,614,911 | B2 | 11/2009 | Hsieh et al. | |
| 7,624,503 | B2 | 12/2009 | Fukuda | |
| 7,642,671 | B2 | 1/2010 | Mahaffey | |
| 7,648,379 | B2 * | 1/2010 | Johnson | H01R 25/16 439/215 |
| D613,248 | S | 4/2010 | Wu | |
| 7,697,268 | B2 * | 4/2010 | Johnson | H01R 25/16 174/53 |
| 7,751,206 | B2 | 7/2010 | Kosacek et al. | |
| 7,826,202 | B2 * | 11/2010 | Johnson | H01R 25/16 307/11 |
| 7,841,878 | B2 * | 11/2010 | Johnson | H01R 25/16 439/215 |
| 7,857,647 | B2 * | 12/2010 | Bracci | H01R 13/5205 439/274 |
| 7,878,845 | B2 | 2/2011 | Byrne | |
| 7,905,736 | B2 * | 3/2011 | O'Rourke | H01R 13/6392 439/214 |
| 7,938,682 | B2 | 5/2011 | Su | |
| 7,976,070 | B2 * | 7/2011 | Kiely | F16L 19/061 174/652 |
| 8,003,888 | B2 | 8/2011 | Owen, Sr. | |
| 8,004,115 | B2 | 8/2011 | Chapel et al. | |
| 8,029,307 | B2 | 10/2011 | O'Rourke | |
| 8,116,940 | B2 | 2/2012 | Keller | |
| 8,172,588 | B2 * | 5/2012 | Johnson | H02G 3/38 174/60 |
| 8,172,589 | B2 * | 5/2012 | Johnson | H01R 25/16 174/60 |
| 8,235,746 | B2 | 8/2012 | He | |
| 8,317,264 | B2 * | 11/2012 | Merensky | B64D 11/06 244/118.5 |
| 8,350,406 | B2 | 1/2013 | Byrne et al. | |
| 8,464,982 | B2 | 6/2013 | Raybell et al. | |
| 8,574,010 | B2 | 11/2013 | Wu | |
| 8,604,342 | B2 | 12/2013 | Solon | |
| 8,608,505 | B2 | 12/2013 | Mantay et al. | |
| 8,653,365 | B1 | 2/2014 | Mixon | |
| 8,702,440 | B2 * | 4/2014 | Nooner | H01R 13/5213 439/279 |
| 9,326,610 | B2 * | 5/2016 | Jacobs | A47C 1/12 |
| 9,531,145 | B2 | 12/2016 | Byrne et al. | |
| 9,686,821 | B2 * | 6/2017 | Kiernan | H05B 1/0244 |
| 9,774,179 | B1 * | 9/2017 | Marcath | H02G 15/10 |
| 9,893,482 | B2 | 2/2018 | Byrne et al. | |
| 2002/0189841 | A1 | 12/2002 | Patterson | |
| 2002/0195523 | A1 | 12/2002 | Cawley | |
| 2004/0050573 | A1 | 3/2004 | Lin et al. | |
| 2004/0095019 | A1 * | 5/2004 | Gevaert | A47C 1/12 307/18 |
| 2004/0182170 | A1 | 9/2004 | Harju | |
| 2004/0256135 | A1 | 12/2004 | Liu | |
| 2005/0011657 | A1 | 1/2005 | Johnston et al. | |
| 2005/0252674 | A1 * | 11/2005 | Lanbach | H01R 4/028 174/840 |
| 2006/0019532 | A1 | 1/2006 | Kiss, Jr. | |
| 2008/0012423 | A1 | 1/2008 | Mimran | |
| 2008/0140565 | A1 | 6/2008 | DeBenedetti et al. | |
| 2008/0196936 | A1 | 8/2008 | Yamamoto et al. | |
| 2009/0053926 | A1 | 2/2009 | Johnson et al. | |
| 2010/0090851 | A1 | 4/2010 | Hauser | |
| 2010/0139733 | A1 | 6/2010 | Jonczyk et al. | |
| 2012/0028488 | A1 | 2/2012 | Puschnigg et al. | |
| 2012/0295473 | A1 | 11/2012 | Chen | |
| 2013/0244463 | A1 | 9/2013 | Talavasek et al. | |
| 2014/0041935 | A1 | 2/2014 | Solon | |
| 2014/0076628 | A1 | 3/2014 | McGrath et al. | |
| 2015/0333461 | A1 * | 11/2015 | Byrne | H01R 25/006 361/623 |

* cited by examiner

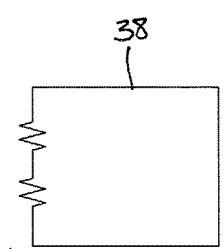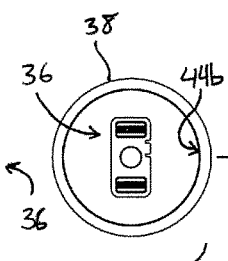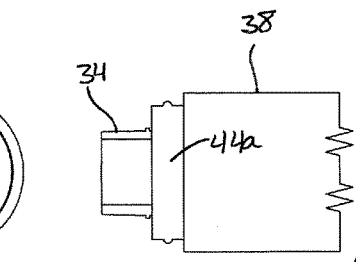
FIG. 4A    FIG. 4B
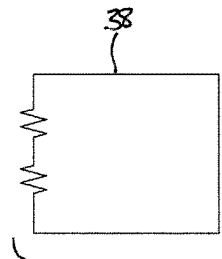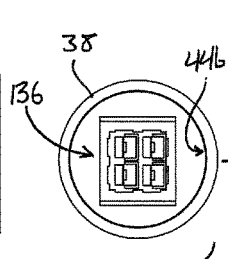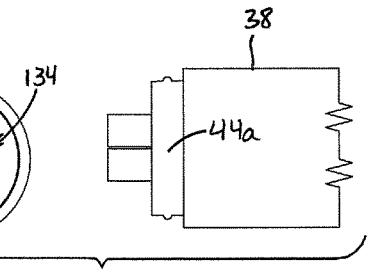
FIG. 5A    FIG. 5B
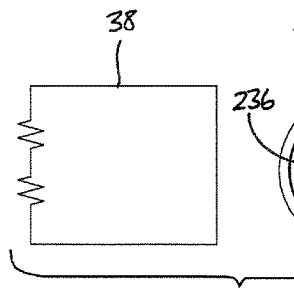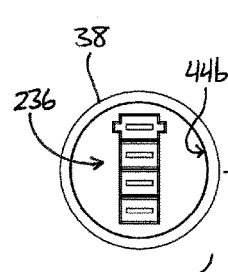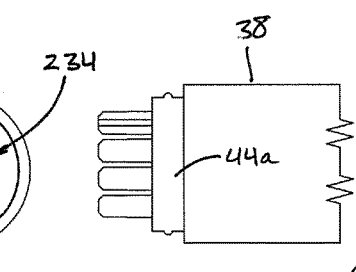
FIG. 6A    FIG. 6B
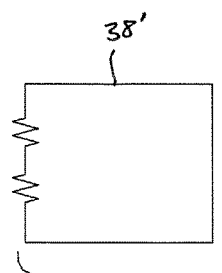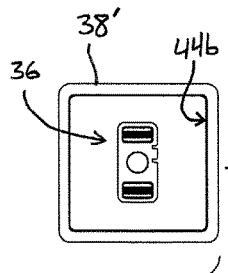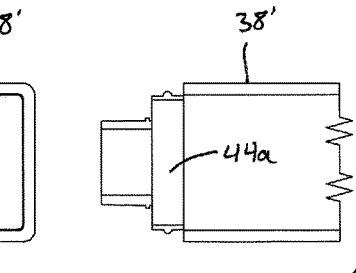
FIG. 7A    FIG. 7B

RUGGED WEATHER RESISTANT POWER DISTRIBUTION

CROSS REFERENCE TO RELATED APPLICATION

The present application claims the filing benefits of U.S. provisional application Ser. No. 62/405,485, filed Oct. 7, 2016, which is hereby incorporated by reference herein in its entirety.

FIELD OF THE INVENTION

The present invention relates to electrical power systems and, more particularly, to electrical power systems having multiple outlets arranged along a main conductor.

BACKGROUND OF THE INVENTION

The need or desire to incorporate electrical power outlets in different locations has increased as portable electronic devices such as mobile phones, portable media players, and the like have proliferated, since these devices often require frequent charging of onboard batteries. Such devices typically require access to either low voltage (e.g. 2V DC to 12V DC) power outlets, or high voltage (e.g., 110V AC or 220V AC) power outlets together with a DC power converter.

SUMMARY OF THE INVENTION

The present invention provides a rugged and weather-resistant power distribution system that is particularly well-suited for use in high volume seating areas such as may be found in stadiums, arenas, auditoriums, movie theaters, and in public transit vehicles such as buses, trains, ferries, and aircraft. The power distribution system allows the operator or administrator of an area to provide users with access to electrical power and/or electronic data for their portable electronic devices, such as smart phones, tablet or laptop computers, media players, and the like. Further, the power distribution system is modular and can be pieced together from a kit or collection of components, can be installed during seating installation or afterward as a retrofit, and can be ruggedized against impacts as well as contaminants such as splashed liquids, dust, and other solid debris.

In one form of the present invention, an electrical system for group seating arrangements includes a plurality of main conduit assemblies, a branch assembly to be coupled between adjacent ones of the main conduit assemblies, one or more fasteners, a seal element, and an electrical or electronic data receptacle to be positioned in the group seating arrangement. The main conduit assemblies each include an elongate casing, a first main line electrical conductor positioned in the elongate casing, and a pair of first main line electrical connectors coupled to the first main line electrical conductor and mounted at respective opposite end portions of the elongate casing. The branch assembly includes an in-line casing portion, a second main line electrical conductor positioned in the in-line casing portion, a pair of second electrical connectors coupled to the second main line electrical conductor and mounted at respective opposite end portions of the in-line casing portion, a branch casing portion, and a branch electrical conductor in the branch casing portion and electrically coupled to the second main line electrical conductor. The second electrical connectors are configured to engage respective first electrical connectors at respective junctions. The branch casing portion is coupled to and extends outwardly away from the in-line casing portion. The fastener(s) secure at least one of the main conduit assemblies relative to the branch assembly. The seal element is positioned at each of the junctions and establishes a weather-resistant connection at each junction. The electrical or electronic data receptacle is positionable at a furniture article and is in electrical communication with the first and second main line electrical conductors via the branch electrical conductor, so that the electrical or electronic data receptacle can convey electrical power or electronic data to a portable electronic device.

According to one aspect, the electrical system includes a DC power supply that is electrically coupled to a first of the main conduit assemblies.

According to another aspect, the electrical or electronic data receptacle is a USB-style electrical power receptacle and/or is a USB-style electrical power and electronic data receptacle.

According to yet another aspect, the in-line casing portion and the branch casing portion of the branch assembly cooperate to form a generally T-shaped hollow casing.

According to still another aspect, there is provided a mounting support bracket for supporting at least two of the main conduit assemblies and the branch assembly in an elevated position above a floor or other support surface.

Optionally, the mounting support bracket engages the in-line casing portion of the branch assembly and engages respective opposite end portions of the at least two main conduit assemblies.

Optionally, conduit fasteners are provided for coupling the respective opposite end portions of the at least two main conduit assemblies to the mounting support bracket. The fasteners to maintain the electrical connections and the contamination-resistant seals at the junctions.

According to a further aspect, a branch electrical connector is coupled to the branch electrical conductor and is mounted at distal end of the branch casing portion, with a branch cable extending between and in electrical communication with each of the branch electrical connector and the electrical or electronic data receptacle.

According to a still further aspect, the seal element includes a first seal element at each of (i) a first of the opposite end portions of each of the main conduit assemblies, and (ii) a first of the opposite end portions of the in-line casing portion, and the first seal elements are annular projections extending in an axial direction.

Optionally, the seal element includes a second seal element at each of (i) a second of the opposite end portions of each of the main conduit assemblies, and (ii) a second of the opposite end portions of the in-line casing portion. The second seal elements are formed by annular radially inwardly facing surfaces of the elongate casings and of the in-line casing portion, with the first seal element sealingly engaging the second seal element at each of the junctions.

In another form of the present invention, an electrical system for group seating arrangements includes at least two main conduit assemblies, a branch assembly, a mechanical fastener, a seal element, and an electrical or electronic data receptacle. The main conduit assemblies include elongate hollow casings with opposite end portions, a first main line electrical conductor positioned in the hollow casing, and first and second electrical connectors coupled to the first main line electrical conductor and mounted at the opposite end portions. The branch assembly is arranged or configured to be coupled between the first and second main conduit assemblies, and includes a hollow in-line casing portion, a second main line electrical conductor disposed in the in-line casing portion, first and second electrical connectors coupled to the second main line electrical conductor and mounted at opposite ends of the in-line casing portion, a hollow branch casing portion extending outwardly away from the in-line casing portion, and a branch electrical conductor positioned in the branch portion and electrically coupled to the first main line electrical conductor. The mechanical fastener is configured to secure the first and second main conduit assemblies relative to one another and relative to the branch assembly. The seal elements are positioned at one or more of the opposite end portions of each elongate hollow casing and at one or both of the opposite ends of the in-line casing portion. The electrical or electronic data receptacle is configured to be positioned at a furniture article, such as an armrest, and is in electrical communication with the first and second main line electrical conductors via the branch electrical conductor. The electrical or electronic data receptacle is configured to convey electrical power or electronic data to a portable electronic device, such as a mobile phone or handheld computer or media player. When the first and second main conduit assemblies are mechanically coupled to the branch assembly to form junctions, the first and second electrical connectors of the first and second main conduit assemblies establish electrical connections with the second and first electrical connectors of the branch assembly, and the seals establish weather-resistant connections at each of the junctions.

Thus, the power distribution system of the present invention provides a suitably ruggedized and weather or contaminant-resistant electrical system that allows patrons of a seating area to have access to electrical power and/or electronic data for their portable electronic devices. The power distribution system may be installed as original equipment, or may be installed later as a retrofit. By using common electrical/electronic connectors, the system can be pieced together quickly from interchangeable parts, although it is envisioned that the lengths of at least the main conduit assemblies may be specified for the seat spacing of a particular application, for example.

These and other objects, advantages, purposes and features of the present invention will become apparent upon review of the following specification in conjunction with the drawings.

BRIEF DESCRIPTION OF THE DRAWING

FIG. 4A depicts side and end elevations of a conduit assembly end portion fitted with a female two-conductor connector;

FIG. 4B depicts end and side elevations of a conduit assembly end portion fitted with compatible two-conductor male connector;

FIG. 5A depicts side and end elevations of a conduit assembly end portion fitted with a female four-conductor connector;

FIG. 5B depicts end and side elevations of a conduit assembly end portion fitted with compatible four-conductor male connector;

FIG. 6A depicts side and end elevations of a conduit assembly end portion fitted with another female inline four-conductor connector;

FIG. 6B depicts end and side elevations of a conduit assembly end portion fitted with compatible male inline four-conductor connector;

FIG. 7A depicts side and end elevations of a square conduit assembly end portion fitted with a female two-conductor connector; and FIG. 7B depicts end and side elevations of a square conduit assembly end portion fitted with compatible two-conductor male connector.

DESCRIPTION OF THE PREFERRED EMBODIMENTS

Figure 1:
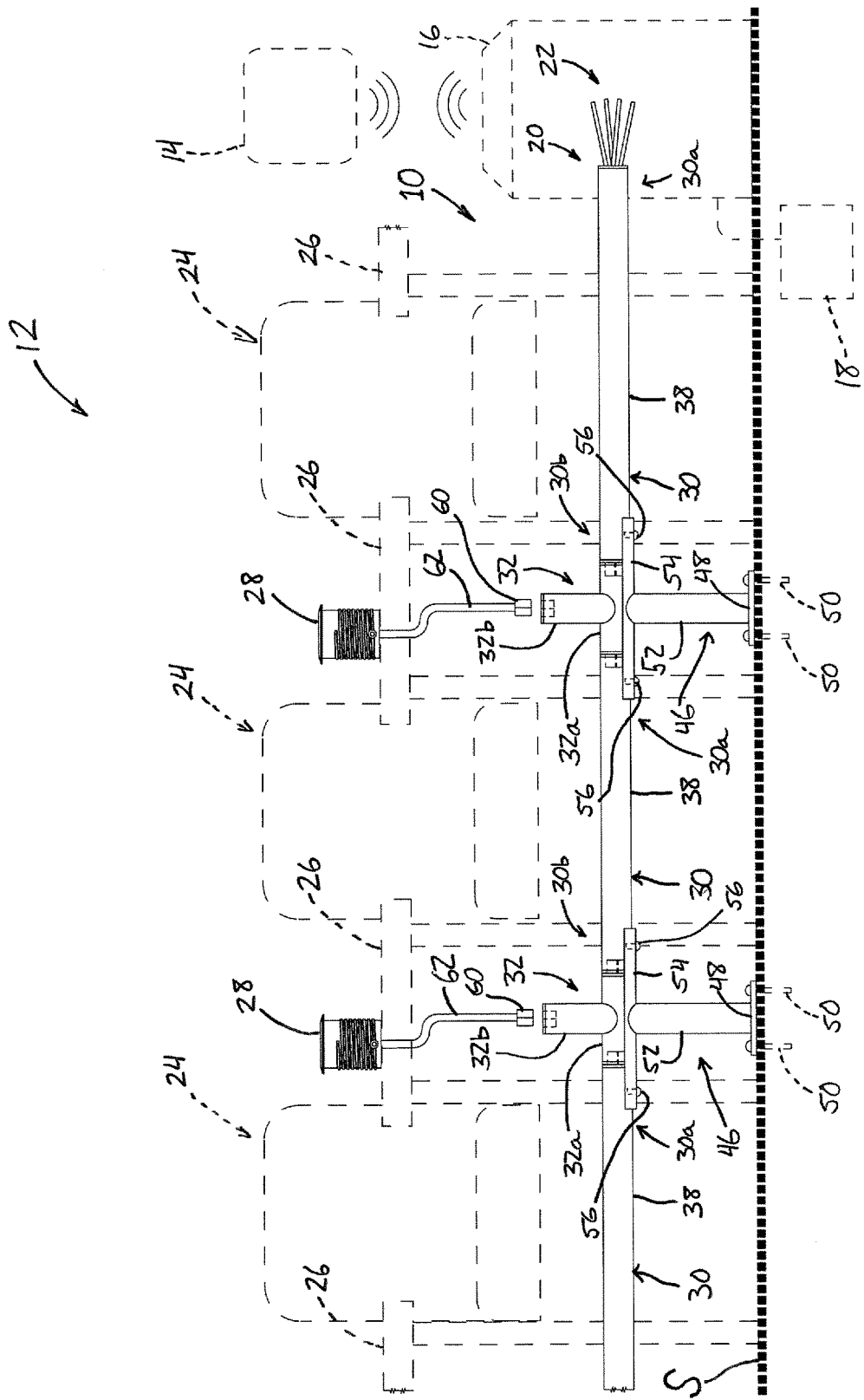
FIG. 1 is a diagrammatic view of an electrical power system in a group seating area, in accordance with the present invention.

Referring now to the drawings and the illustrative embodiments depicted therein, a rugged and weather-resistant power distribution system 10 is specially adapted for installation in a group seating area 12 (FIG. 1), such as in theaters, arenas, stadiums, public transit stations, transportation vehicles, and the like. As described in more detail below, power distribution system 10 is constructed from a plurality of component parts that can be quickly assembled together in a snap-fit arrangement, with each snap-fit junction being substantially sealed against moisture intrusion. The sealed system is useful for outdoor seating areas exposed to weather, and also for indoor seating areas where frequent spills from beverages and cleaning activities such as wet-mopping can splash water and other liquids onto or around the system. The power distribution system 10 may be installed into existing seating areas as a retrofit, or may be installed during the original installation of seating or other areas where electrical charging power may be desired.

Power distribution system 10 permits electrical charging of portable electronic devices, such as handheld mobile phones and computing devices, tablet computers, and the like. Optionally, the system 10 establishes wireless or wired electronic communications between a connected portable electronic device and an electronic data network 14 associated with the group seating area 12, such as using BACnet protocol, which is a standard protocol used for building automation and control networks. The system 10 may also be operable reducing energy losses due to electrically energized but unused power outlets. The electronic communications and energy loss mitigation features that may be incorporated into system 10, thus making it an "intelligent" system, are described in commonly-owned U.S. patent application Ser. No. 15/723,816, filed Oct. 3, 2017, now U.S. Pat. No. 10,425,236, entitled INTELLIGENT ELECTRICAL POWER DISTRIBUTION SYSTEM, which is hereby incorporated herein by reference in its entirety.

Rugged weather-resistant power distribution system 10 includes a DC power supply 16 that receives power from an AC power source 18, which may be associated with an AC electrical circuit associated with a building. DC power supply 16 converts the AC voltage input to a DC low voltage output to a low voltage main line 20 including a plurality of conductors 22. DC power supply 16 may include a controller that is in wired or wireless communication with electronic data network 14, whereby DC power supply 16 may be controlled (e.g., energized and de-energized) in response to signals received from electronic data network 14. It will be appreciated that the electrical systems of vehicles are more likely to be low voltage DC electrical systems that would not require an AC-to-DC power converter. In the illustrated embodiment of FIG. 1, seating area 12 includes three individual seats 24, each with access to at least one armrest 26 in which one or more electrical power and/or data outlets or units 28 may be mounted. Such power and/or data units 28 may include, for example, NODE® grommet-style power and data outlets available from Byrne Electrical Specialists, Inc. of Rockford, Mich.

Figure 2:
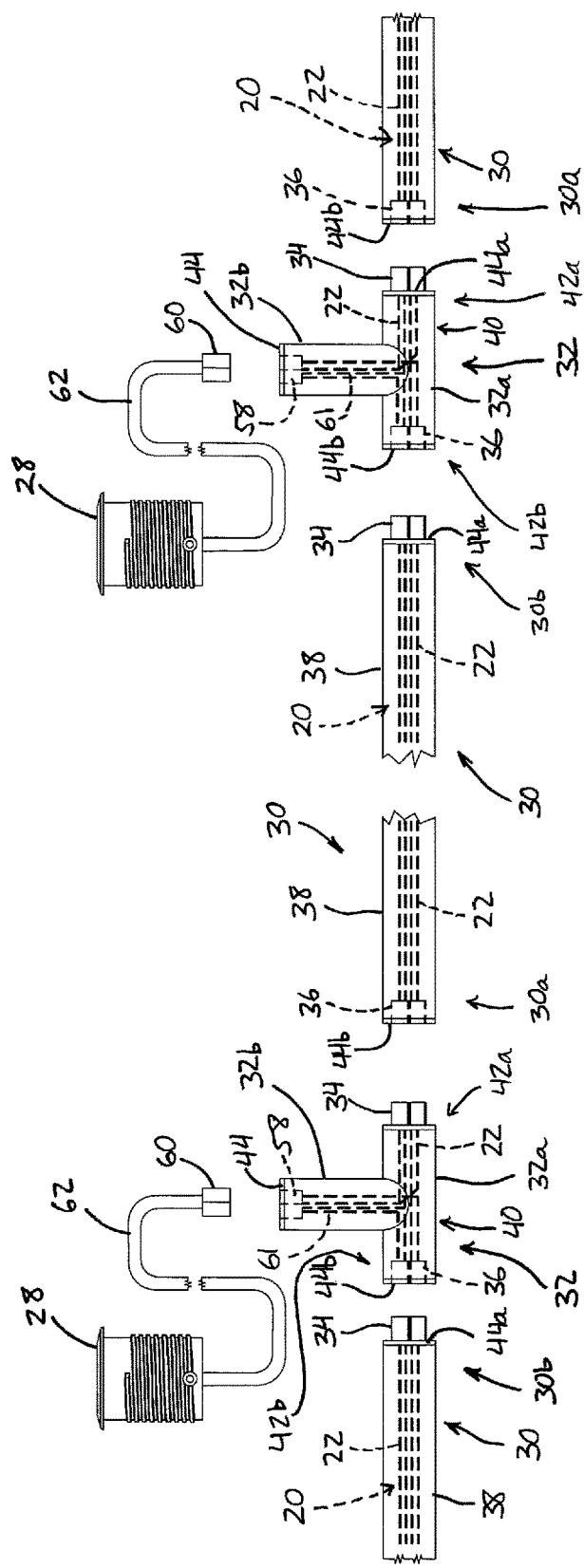
FIG. 2 is a partially exploded diagrammatic view of portions of the electrical power system of FIG. 1.
Figure 3:
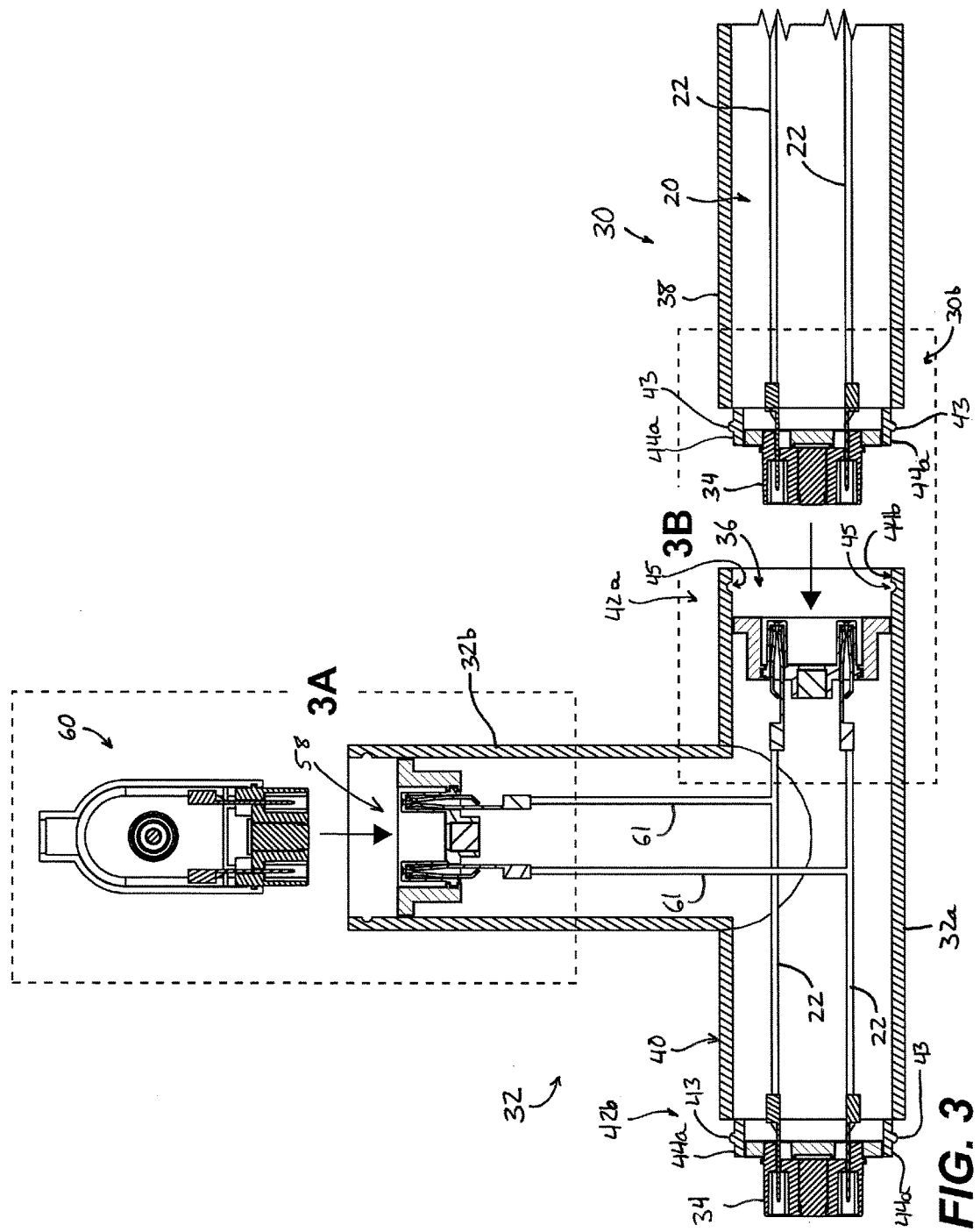
FIG. 3 is an enlarged sectional view of a T-connector assembly, a plug, and an end portion of an electrical conduit assembly of the electrical power system.

Low voltage DC power is routed to power units 28 by power distribution system 10 including low voltage main line 20, which is constructed from a plurality of elongate electrical conduit or jumper assemblies 30 and in-line portions 32a of a plurality of branch or T-connector assemblies 32, such as shown in FIGS. 1-3. T-connector assemblies 32 further include branch portions 32b that extend outwardly away from in-line portions 32a, and to which power units 28 connect. Each electrical conduit assembly 30 includes an upstream end portion 30a and a downstream end portion 30b. In the illustrated embodiment, except for the conduit assembly 30 that enters or connects to DC power supply 16, each electrical conduit assembly 30 includes a male electrical connector 34 at its upstream end portion 30a, and a female electrical connector 36 at its downstream end portion 30b. The conduit assembly 30 that enters DC power supply 16 also includes a female electrical connector 36 at its downstream end portion 30b, but instead of a male electrical connector at its upstream end portion 30a it instead has electrical conductors 22 exiting the upstream end portion 30a and terminating at respective electrical contacts (not shown) in DC power supply 16.

The male and female connectors may be Anderson-style connectors 134, 136, such as shown in FIGS. 5A and 5B, which are available from Anderson Power Products Inc., of Sterling, Mass., or may be substantially any compatible male and female connectors having sufficient electrical power capacity for a desired application. For example, in FIGS. 3-4B, 7A and 7B the male and female connectors 34, 36 are keyed two-conductor connectors designed for low voltage DC applications, and are more fully described in commonly-owned U.S. provisional application, Ser. No. 62/518,213, filed Jun. 12, 2017 and entitled "ELECTRICAL CONNECTOR WITH HAPTIC FEEDBACK," from which U.S. Pat. No. 10,381,782 claims priority, and which is hereby incorporated herein by reference in its entirety. The non-conductive portions of connectors 34, 36 may be configured and made of materials designed to provide a secondary sealing function for the electrical contacts contained therein. Still other types of connectors may include four-conductor inline connectors 234, 236 as shown in FIGS. 6A and 6B.

It will be appreciated that although the power distribution assembly 10 is primarily described herein as providing access to low voltage DC power in seating areas, the principles of the present invention may be applied to the distribution of high voltage AC power and/or of electronic data, with little or only minimal modification to meet electrical codes. Such modifications may include, for example, wire gauge, connector size and type, shielding, electrical grounding, and securing couplers at each joint. Electrical power units 28 may receive high voltage AC power (e.g., 110V or 220V) for directly energizing one or more high voltage AC power receptacles, and may include AC-to-DC electrical converters for supplying low voltage DC electrical power to one or more DC outlets such as USB power outlets. Optionally, shielded electronic data lines may be routed through the conduits of the power distribution assembly and to electrical power and data outlets or units 28. It is further envisioned that wireless electrical power transmission technology, such as inductive power transmission coils, may be substituted for the more traditional direct-contact electrical receptacles at armrests 26 or other furniture surfaces. Such technologies are more fully described in commonly-owned U.S. patent application Ser. No. 15/583, 379, filed May 1, 2017, and in commonly-owned U.S. Pat. No. 9,748,709, both of which are hereby incorporated herein by reference in their entireties.

Conduit assemblies 30 include cylindrical tubular outer casings 38 that are sufficiently strong so as to resist bending or other damage from impacts or loads that are typical in a public seating area, and to resist the temporary or permanent loss of weather resistance along power distribution assembly 10, such as when the assembly is exposed to foot traffic or other activities that could result in an occasional impact or application of heavy loads. For example, outer casings 38 may be made from 18-gauge steel having a corrosion-resistant surface coating, or from 18-gauge stainless steel. T-connector assemblies 32 have generally T-shaped outer casings 40, and it is envisioned that the T-shaped outer casings 40 would be constructed similarly and from the same or compatible materials as the tubular outer casings 38 of conduit assemblies 30.

Male connectors 34 and female connectors 36 may include mechanical snap-together or thread-together or twist-lock fittings that secure the connectors 34, 36 together once fully engaged by pressing axially together. Alternatively, each end portion 30a, 30b of each conduit assembly 30 may have a mechanical snap-together or thread-together or twist-lock fitting, and in-line portions 32a of T-connectors 32 would have opposite end portions 42a, 42b with compatible snap-together fittings, to provide secure engagement of the respective end portions 30a, 30b of the conduit assemblies 30 and the respective end portions 42a, 42b of the T-connectors' in-line portions 32a. Optionally, each snap-together or thread-together fitting interface or junction may be further secured and protected using a threaded collar that is rotatably mounted at the end of one conduit assembly (or T-connector), and that extends axially outwardly to threadedly engage a threaded outer surface at the end of an adjacent conduit assembly (or T-connector). It is further envisioned that outer casings 38, 40 may incorporate threaded surfaces or twist-lock connection interfaces so that the casings 38, 40 may be secured together by engaging their respective ends and rotating them relative to one another, in which case it may be desirable to mount male and female connectors 34, 36 inside the respective outer casings 38, 40 such that the connectors 34, 36 are able to freely rotate in the casings 38, 40.

In addition to having mechanical securing interfaces, each end portion 30a, 30b of each conduit assembly 30, and each end portion 42a, 42b of each T-connector 32, includes a respective male or female seal element 44a or 44b disposed around the respective connector 34 or 36. The seal elements 44a, 44b are pressed together during engagement of connectors 34, 36 and mechanical securement of the components, to thereby form a weather-resistant seal at each connection, thus limiting or preventing the intrusion of moisture and other contaminants into the connectors 34, 36.

Figure 3A:
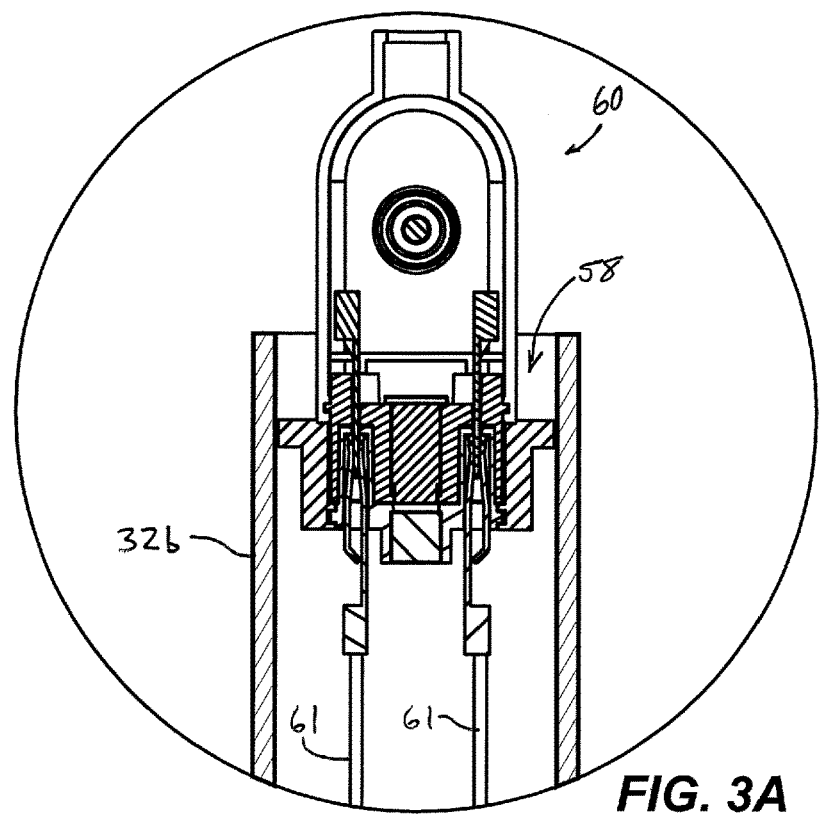
FIGS. 3A and 3B are enlarged views of the general regions designated 3A and 3B in FIG. 3, respectively, shown with the connector assembly, plug, and electrical conduit assembly portion coupled together.
Figure 3B:
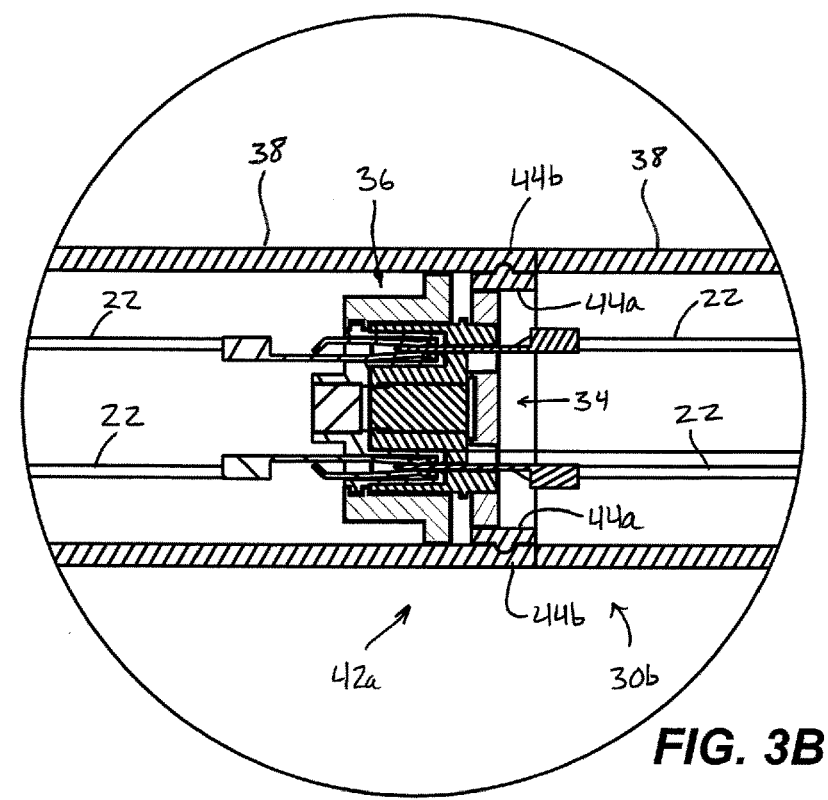

In the illustrated embodiment, and as best shown in FIGS. 3 and 3B, male seal elements 44a are annular projections that project longitudinally outwardly from respective downstream end portions 30b of the conduit assemblies 30 and downstream end portions 42a of the in-line portions 32a of T-connectors 32. Male seal elements 44a surround the respective male connectors 34, and include radially-outwardly facing ribs or ridges 43 for engaging respective annular channels or detents 45 that are formed along the annular inner walls of the female seal elements 44b, such as shown in FIG. 3B. Male seal elements 44a may be made of a resilient material, such as silicone rubber or substantially any other common weather-resistant gasket material, while female seal elements 44b may be formed simply from the open ends of the outer casings 38, 40 of conduit assemblies 30 and T-connectors 32. However, it will be appreciated that additional sealing materials, including room temperature vulcanizing (RTV) sealants applied during assembly, may be used to ensure a weather-resistant seal at each connection or junction. Various different types of seal elements are also envisioned, such as generally planar compressible discs with central openings that provide access to the female connector 36, or through which male connector 34 protrudes. In an alternative embodiment, one or more O-rings or other types of seals may be used to establish a weather-resistant seal at each junction or interface.

In the illustrated embodiment, power distribution system 10 includes a plurality of mounting support brackets 46 having respective base portions 48 that are secured to a support surface S using fasteners 50, and with respective upstanding legs 52 that terminate at respective arcuate conduit supports 54, which cradle and support the end portions 30a, 30b of conduit assemblies 30 and support the in-line portions 32a of T-connectors 32, such as shown in FIG. 1. Arcuate conduit supports 54 have a concave-up configuration to generally conform to outer surface portions of the respective outer casings 38, 40 of conduit assemblies 30 and T-connectors 32. However, the conduit supports and outer casing shapes are not necessarily limited to arcuate and cylindrical surfaces, and it will be appreciated that square outer casings 38' (FIGS. 7A and 7B) or other polygonal-section tubes and planar or angled surfaces may be used, without departing from the spirit and scope of the present invention.

Conduit fasteners 56 are used to secure conduit assemblies 30 to each conduit support 54. Conduit fasteners 56 also fix the positions of the conduit assemblies 30 relative to one another on either end 42a, 42b of a given T-connector 32, and thus serve to secure and stabilize each interface or junction between two conduit assemblies 30 and a T-connector 32 disposed between them. The use of conduit fasteners 56 also aids in maintaining a weather-resistant sealed connection between each conduit assembly 30 and T-connector. While the illustrated conduit fasteners 56 may be rivets, threaded bolts, or the like, it will be appreciated that other types of conduit fasteners such as hose clamps or similar couplers, such as BAND-IT® couplings, available from Band-It-Idex, Inc. of Denver, Colo., may also be used to secure the conduit assemblies 30 and T-connectors 32 to mounting support brackets 46.

Branch portions 32b of T-connectors are fitted with female branch connectors 58 for carrying electrical power and/or electronic data, such as USB-style or Anderson-style connectors. Female branch connectors 58 receive power and/or data signals from branch conductors 61 that extend through branch portions 32b of T-connector assemblies, and that are spliced to the main conductors 22 that form low voltage DC main line 20 through conduit assemblies 30 and in-line portions 32a of T-connector assemblies 32. Female branch connectors 58 are configured to receive respective plugs 60 that are associated with electrical power and/or data outlets or units 28 and electrically connected thereto by branch conductor cables 62, such as shown in FIGS. 2-3A.

Female branch connectors 58 may be substantially identical to female connectors 36, and plugs 60 may be substantially identical to male connectors 34. Conductor cables 62 are illustrated as flexible cables that are routed through respective armrests 26, such that protective conduits or armoring may not be required for cables 62. However, it is envisioned that conductor cables 62 may be routed through protective rigid or flexible conduits or conduit sections, such as conduit assemblies 30, and could thus be connected to branch portions 32b and connectors 58 in substantially the same or substantially the same manner that conduit assemblies 30 can connect to each other and to the in-line portions 32a of T-connector assemblies 32.

Once the rugged weather-resistant power distribution system 10 is assembled and mounted as shown in FIG. 1, it provides users of seating area 12 with access to at least low voltage DC power, and optionally with access to electronic data connections, for portable electronic communications devices and the like. The joints or junctions of power distribution system 10 are sealed against intrusion by moisture and contaminants, and the structural components of the system are constructed from sufficiently strong materials so as to be appropriate for installation in arenas, stadiums, theaters, public transit vehicles, and other areas that are subject to high levels of foot traffic including inadvertent impacts, liquid spills, and other hazards to which non-ruggedized electrical systems may be susceptible. Power distribution system 10 can be quickly assembled and disassembled using connection interfaces that do not necessarily require tools, and using runs of one or more conduit assemblies 30 having the same or different lengths to achieve a desired distance between T-connector assemblies and electrical power or data outlets. Conduit assemblies 30 may also be capable of connecting to branch portions 32b of T-connector assemblies 32, to provide lengths of ruggedized conductors between the main line 20 and the electrical power or data outlets or units 28.

Thus, the rugged and weather-resistant power distribution system of the present invention is a modular system that allows for efficient retrofitting of existing seating areas to provide access to low voltage DC power outlets, and optionally to electronic data outlets. It is also envisioned that the principles of the present invention may be applied to high voltage AC electrical systems, such that the system is not necessarily limited to low voltage DC power and electronic data applications. Patrons of a venue or travelers in a vehicle may be provided with convenient access to electrical power and/or data, using the power distribution system of the present invention, which may be installed as original equipment or installed later as a retrofit, such as a retrofit kit that is delivered to an installation site for assembly.

Changes and modifications in the specifically-described embodiments may be carried out without departing from the principles of the present invention, which is intended to be limited only by the scope of the appended claims as interpreted according to the principles of patent law including the doctrine of equivalents.

The embodiments of the invention in which an exclusive property or privilege is claimed are defined as follows:

1. An electrical system for a group seating arrangement, said electrical system comprising:
    a plurality of main conduit assemblies each comprising:
        an elongate casing;
        a first main line electrical conductor disposed in said elongate casing; and a pair of first main line electrical connectors coupled to said first main line electrical conductor and mounted at respective opposite end portions of said elongate casing;

a branch assembly adapted to be coupled between two of said main conduit assemblies, said branch assembly comprising:

an in-line casing portion;

a second main line electrical conductor disposed in said in-line casing portion;

a pair of second main line electrical connectors coupled to said second main line electrical conductor and mounted at respective opposite end portions of said in-line casing portion, wherein said second main line electrical connectors are configured to engage respective ones of said first electrical connectors at respective junctions;

a branch casing portion coupled to and extending outwardly away from said in-line casing portion; and a branch electrical conductor disposed in said branch casing portion and electrically coupled to said second main line electrical conductor;

at least one mechanical fastener configured to secure at least one of said main conduit assemblies relative to said branch assembly;

a seal element pair positioned at each of said junctions and adapted to establish a weather-resistant connection at each of said respective junctions;

a mounting support bracket adapted to support at least two of said main conduit assemblies and said branch assembly in an elevated position above a support surface, wherein said mounting support bracket is configured to engage and secure said in-line casing portion of said branch assembly and respective ones of said opposite end portions of said at least two main conduit assemblies; and an electrical or electronic data receptacle adapted to be positioned at a furniture article of the group seating arrangement and in electrical communication with said first and second main line electrical conductors via said branch electrical conductor, wherein said electrical or electronic data receptacle is configured to convey electrical power or electronic data to a portable electronic device.

2. The electrical system of claim 1, further comprising a DC power supply electrically coupled to a first one of said main conduit assemblies.

3. The electrical system of claim 1, wherein said electrical or electronic data receptacle comprises a USB-style electrical power receptacle or a USB-style electrical power and electronic data receptacle.

4. The electrical system of claim 1, wherein said in-line casing portion and said branch casing portion of said branch assembly cooperate to form a substantially T-shaped hollow casing.

5. The electrical system of claim 1, wherein said at least one mechanical fastener comprises a plurality of conduit fasteners, said conduit fasteners for coupling said respective opposite end portions of said at least two main conduit assemblies to said mounting support bracket, wherein said conduit fasteners are adapted to maintain said junctions.

6. The electrical system of claim 1, further comprising a branch electrical connector coupled to said branch electrical conductor and mounted at distal end of said branch casing portion, and a branch cable extending between and in electrical communication with each of said branch electrical connector and said electrical or electronic data receptacle.

7. The electrical system of claim 1, wherein said seal element pair comprises a first seal element at each of (i) a first one of said opposite end portions of each of said main conduit assemblies, and (ii) a first one of said opposite end portions of said in-line casing portion, wherein each of said first seal elements comprises an annular projection extending in an axial direction.

8. The electrical system of claim 7, wherein said seal element pair comprises a second seal element at each of (i) a second one of said opposite end portions of each of said main conduit assemblies, and (ii) a second one of said opposite end portions of said in-line casing portion, wherein each of said second seal elements comprises an annular radially inwardly facing surface, wherein said first seal element sealingly engages said second seal element at each of said junctions.

9. The electrical system of claim 8, wherein said first and second seal elements are disposed circumferentially around said first and second electrical connectors at each of said junctions.

10. An electrical system for group seating arrangement, said electrical system comprising:

first and second main conduit assemblies each comprising:

an elongate hollow casing with opposite end portions;

a first main line electrical conductor disposed in said elongate hollow casing; and first and second main electrical connectors coupled to said first main line electrical conductor and mounted at respective ones of said opposite end portions of said elongate hollow casing;

a branch assembly configured for coupling between said first and second main conduit assemblies, said branch assembly comprising:

a hollow in-line casing portion;

a second main line electrical conductor disposed in said hollow in-line casing portion;

first and second branch electrical connectors coupled to said second main line electrical conductor and mounted at respective opposite ends of said hollow in-line casing portion;

a hollow branch casing portion extending outwardly away from said hollow in-line casing portion; and a branch electrical conductor disposed in said hollow branch casing portion and electrically coupled to said second main line electrical conductor;

at least one mechanical fastener configured to secure said first and second main conduit assemblies relative to one another and relative to said branch assembly;

a plurality of seal element pairs, a first seal element of said seal element pairs disposed at one of said opposite end portions of each of said elongate hollow casings and a second seal element of said seal element pairs disposed at one of said opposite ends of said hollow in-line casing portion;

an electrical or electronic data receptacle configured to be positioned at a furniture article of said group seating arrangement and in electrical communication with said first and second main line electrical conductors via said branch electrical conductor, wherein said electrical or electronic data receptacle is configured to convey electrical power or electronic data to a portable electronic device; and a mounting support bracket adapted to support said first and second main conduit assemblies and said branch assembly in an elevated position above a support surface, wherein said mounting support bracket is configured to engage and secure said in-line casing portion of said branch assembly and respective ones of said opposite end portions of said first and second main conduit assemblies; and wherein, when said first and second main conduit assemblies are mechanically coupled to said branch assembly to form junctions, said first and second main electrical connectors of said first and second main conduit assemblies establish electrical connections with said second and first branch electrical connectors of said branch assembly, and said seal element pairs establish weather-resistant connections at each of said junctions.

11. The electrical system of claim 10, further comprising a DC power supply in electrical communication with said first main line electrical conductor.

12. The electrical system of claim 11, wherein said electrical or electronic data receptacle comprises a USB-style electrical power receptacle or a USB-style electrical power and electronic data receptacle.

13. The electrical system of claim 10, wherein said at least one mechanical fastener comprises a plurality of conduit fasteners, said conduit fasteners for coupling respective opposite end portions of said first and second main conduit assemblies to said mounting support bracket, wherein said conduit fasteners are adapted to maintain said junctions between said first and second main conduit assemblies and said branch assembly.

14. The electrical system of claim 10, further comprising a branch electrical connector coupled to said branch electrical conductor and mounted at an end of said branch casing portion, and a conductor cable extending between and in electrical communication with said branch electrical connector and said electrical or electronic data receptacle.

15. The electrical system of claim 10, wherein one of said first and second seal elements comprises an annular projection that extends axially outwardly.

16. The electrical system of claim 15, wherein another of said first and second seal elements comprises an annular inwardly-facing surface at said another of said first and second seal elements, wherein said one of said first and second seal elements engages said another of said first and second seal elements.

* * * * *